Figure 1:
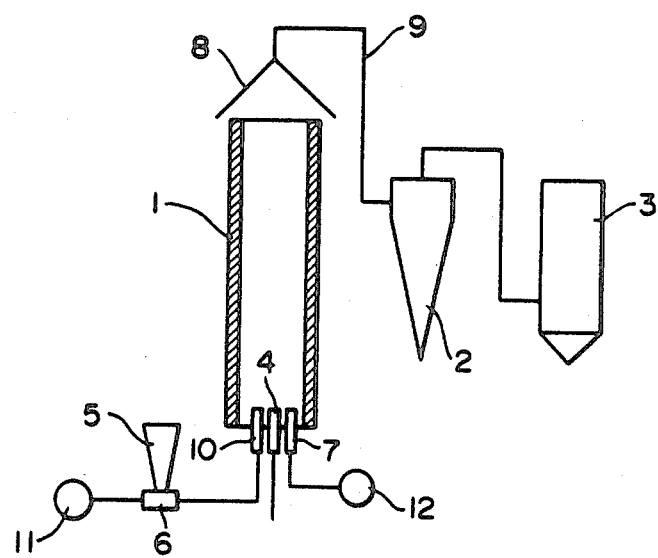

United States Patent [19]

Manabe et al.

[11] Patent Number: 4,693,739
[45] Date of Patent: Sep. 15, 1987

[54] METHOD FOR PRODUCING GLASS BUBBLES

[75] Inventors: Seiichiro Manabe, Itami; Tsutomu Sawano, Nishinomiya; Takemi Saijo, Yokkaichi, all of Japan

[73] Assignee: Nippon Sheet Glass Co., Ltd., Osaka, Japan

[21] Appl. No.: 746,118

[22] Filed: Jun. 18, 1985

[30] Foreign Application Priority Data

Jun. 21, 1984 [JP] Japan .................................. 59-127865

[51] Int. Cl.⁴ ........................ C03B 19/08; C03B 19/10
[52] U.S. Cl. ........................................ 65/21.4; 65/22; 65/30.12; 65/32
[58] Field of Search .................... 65/21.3, 21.4, 30.12, 65/22, 32, 142

[56] References Cited

U.S. PATENT DOCUMENTS

| | | | |
|---|---|---|---|
| 2,524,613 | 10/1950 | Wainer | 65/21.3 |
| 3,272,615 | 9/1966 | Hoffman et al. | 65/21.3 X |
| 3,403,990 | 10/1968 | Schulz et al. | 65/22 |
| 3,692,507 | 9/1972 | Gladney et al. | 65/22 X |
| 3,870,496 | 3/1975 | Cutler | 65/22 |
| 4,059,425 | 11/1977 | Brydges et al. | 65/30.12 X |
| 4,475,936 | 10/1984 | Aston et al. | 65/142 |

FOREIGN PATENT DOCUMENTS

| | | | |
|---|---|---|---|
| 59-64564 | 4/1984 | Japan | 65/30.12 |
| 716998 | 2/1980 | U.S.S.R. | 65/30.12 |

Primary Examiner—Robert Lindsay

[57] ABSTRACT

A method for producing glass bubbles, which comprises heating a glass powder containing a gas-blowing agent in an atmosphere containing steam having a partial steam pressure of at least 0.2 atmosphere to foam it.

5 Claims, 1 Drawing Figure

METHOD FOR PRODUCING GLASS BUBBLES

This invention relates to an improved method for the production of glass bubbles, and more specifically, to a method for producing in high yields minute hollow glass spheres which are useful as additives to plastic articles or slurry explosives.

Generally, minute hollow glass spheres are produced by a method comprising blowing a powder of sheet glass or bottle glass scraps or a powder of volcanoic glass into a flame to heat-soften the glass in a floating and fluidized state, and gasifying a blowing material such as $SO_3$, $H_2O$, F and $CO_2$ dissolved in the glass powder or artificially dissolved in it, as described, for example, in U.S. Pat. No. 3,365,315.

According to the above method, foaming of the glass powder is dependent upon the temperature of the heating atmosphere and the residence time. But since the temperature of the flame and the flow rate of the gas are not uniform, a difference in the degree of foaming arises among the individual glass particles, and the yield of hollow glass spheres having the desired specific gravity is low. To make the heating conditions for the glass powder uniform, a method may be feasible which involves allowing the glass powder to fall into an electrical furnace. This method however gives rise to another problem in that the efficiency of heat conduction is low owing to heating by irradiation and a very long electrical furnace is required in order to heat the glass powder to a temperature at which it fully foams, thereby leading to high costs of the apparatus and energy required.

In view of the state of the art described above, the present inventors made extensive investigations in order to provide a method for producing minute glass bubbles in an increased yield by reheating a glass powder containing a gas-blowing material. These investigations have led to the surprising discovery that the yield of glass bubbles is markedly increased if steam is present in a heating atmosphere for the glass powder in such a proportion as to adjust the partial pressure of steam to at least 0.2 atmosphere.

Thus, according to this invention, there is provided a method for producing glass bubbles which comprises heating a glass powder containing a gas-blowing material in an atmosphere containing steam having a partial steam pressure of at least 0.2 atmosphere thereby to foam the glass powder.

Frequently, anhydrous sodium sulfate, calcium carbonate, sodium carbonate, calcium fluoride, etc. are added during the production of sheet glass or bottle glass. When the glass-forming components are melted by heating, these additive components are decomposed to release $SO_3$, $CO_2$, $F_2$, etc. Most of these gases dissipate into the atmosphere, but partly remain in the dissolved state in the glass. For example, $SO_3$ dissolved in the glass decomposed on reheating the glass ($SO_3 \rightarrow SO_2 + O_2$) to form bubbles. This phenomenon has long been known as the "reboil phenomenon". The formation of glass bubbles takes advantage of the reboil phenomenon by heating the glass powder and is carried out by heating a glass powder containing such gas-blowing materials as mentioned above. The reboil phenomenon has been commonly used in the production of glass bubbles.

The method of the present invention can be carried out basically by the conventional technique of producing glass bubbles except that a heating atmopshere containing steam having a partial pressure of at least 0.2 atmosphere is used. Such a technique of producing glass bubbles is disclosed, for example, in U.S. Pat. No. 3,365,315, and the disclosure of this U.S. patent is cited herein in lieu of giving a detailed description thereof.

A glass powder containing a gas-blowing material can be prepared, for example, by adding a precursor such as $Na_2SO_4$, $Na_2CO_3$, $CaCO_3$ or $CaF_2$ of a gas-blowing material such as $SO_3$, $CO_2$, $H_2O$ and $F_2$ as one of glass forming components at the time of producing glass, or by impregnating the glass powder with $SO_3$, $CO_2$, $H_2O$, etc. under high pressure in an autoclave. Advantageously, the glass powder used in this invention has a particle diameter of generally 5 to 200 microns, preferably 10 to 100 microns.

According to this invention, the glass material containing the gas-blowing material is heated in an atmosphere containing steam having a partial steam pressure of at least 0.2 atmosphere.

In the present specification and the appended claims, the partial pressure of steam in the atmosphere is the partial pressure of steam when the total pressure of the atmosphere is assumed to be 1 atmosphere. In the present application, it can be measured in accordance with the method described in JIS Z8808-1977, Method of Measuring Dust Content in Flue Gas, 5. "Measurement of the Water Content of the Waste Gas".

The following methods, for example, are conveniently used in this invention to provide partial steam pressures of at least 0.2 atmosphere in the heating atmosphere for the glass powder.

(A) Steam is blown into a heating chamber or water is sprayed to it. An electrical heating furnace may be used at this time. But to reduce the energy cost, it is preferable to recycle the discharged steam for reuse.

(B) Hydrogen gas is used as a fuel.

(C) A hydrocarbon-type fuel such as methane, ethane, propane, butane, kerosene, heavy oil, methanol or ethanol is used as a fuel. At the same time, oxygen or oxygen-enriched air is used for burning to decrease the partial pressure of nitrogen in the burnt gas.

(D) A combination of two or three of the methods (A), (B) and (C) is used.

When the fuel cost or the cost of oxygen is considered, it is preferred that the method of this invention be industrially carried out by using natural gas as a fuel, burning it with air, and increasing the partial pressure of steam in the burning gas by feeding water, preferably steam.

If the partial pressure of steam in the heating atmosphere is at least 0.2 atmosphere, the effect of increasing the yield of glass bubbles intended by the present invention can be achieved. But when the partial pressure of steam exceeds 0.5 atmosphere, no corresponding increase in the effect of increasing the yield can be expected, and it rather gives rise to a possibility of lowering the temperature of the burning gas. Generally, the suitable partial pressure of steam is within the range of 0.2 to 0.5 atmosphere, particularly 0.23 to 0.4 atmosphere.

It has not been theoretically elucidated why the adjustment of the partial pressure of steam in the heating atmosphere for the glass powder to at least 0.2 atmosphere leads to an increase in the yield of glass bubbles obtained by the foaming of the glass powder. But the following causes may be assumed.

(1) The formation of hollow glass spheres is considered to be effected on the principle that as stated herein-above, the glass powder is softened by heating, and thereafter $SO_3$ or $H_2O$ dissolved in the glass becomes supersaturated as a result of the rise of the glass temperature and becomes gasified and expanded (namely, "reboiled"). The reboiling in the glass occurs to a greater extent as the temperature of the glass becomes higher. Even at a constant temperature, changes in the glass composition cause changes in the solubility of $SO_3$ or $H_2O$, and may lead to easier reboiling. The present inventors found that when a fine glass powder is heated to a higher temperature in the presence of steam, $B_2O_3$ or alkali metal oxides in the glass volatilize in unexpectedly large amounts within very short periods of time to change the glass composition, and that the glass composition changes to a higher degree as the partial pressure of steam in the heating atmosphere is higher.

It is presumed that in the present invention, the presence of a large amount of steam in the atmosphere promotes changing of the glass composition whereby the solubility of $SO_3$ or $H_2O$ in the glass is reduced and it is more easily reboiled.

(2) It is presumed on the other hand that when glass makes contact with steam at high temperatures, hydrated glass will form. Since glass usually has a lowered softening temperature on hydration, the hydrated glass is less viscous at high temperatures and has increased foamability.

It is also known, although no reason can be assigned, that the reboiling of gas components in the glass is sensitive to the heating atmosphere. The present inventors have found that the yield of glass bubbles can be further increased by providing a reducing atmopshere as the heating atmosphere in addition to increasing the partial pressure of steam in the heating atmosphere.

The reducing atmosphere can easily be formed, for example, by decreasing the ratio of oxygen to a fuel fed to a heating chamber below the stoichiometrial value, and incompletely burning the fuel in the heating chamber.

One typical procedure for carrying out the method of this invention comprises feeding a glass powder containing a gas-blowing material, a fuel, an oxygen-containing gas (such as air) required for the burning of the fuel, and water to a heating chamber, for example a vertical furnace constructed of a refractory or a water-cooled metal, and burning the fuel to thereby heat and foam the glass powder. In this procedure, the total partial pressure of steam derived from water supplied and steam that may be generated by the burning should be adjusted to at least 0.2 atmosphere.

Preferably, the water is supplied in the form of vapor to the heating chamber simultaneously with the supplying of the glass powder.

The temperature in the heating chamber may generally be about 1,000 to about 1,600, preferably about 1300° to about 1500° C., and the sufficient residence time is about 0.1 to about 3 seconds.

The method of this invention described above can give glass bubbles in a yield at least about 1.5 times as high as that in the prior art, and contributes greatly to the industry.

The following Example illustrates the present invention more specifically.

EXAMPLE

FIG. 1 shows a rough sketch showing one example of an apparatus for producing hollow glass spheres in accordance with this invention.

A powdery glass material is fed to a hopper (5) in a fixed quantity by a suitable feed device (not shown) such as a screw feeder or a vibratory feeder. The botto portion of the hopper (5) is connected to an ejector (6) having a nozzle therein, and compressed air is supplied to the nozzle from a compressor (11) or the like. The glass material which falls from the hopper (5) is dispersed by an air current jetted from the nozzle of the ejector (6) and blown in the dispersed state into a heating furnace (1) through a batch blowing opening (10) at the bottom of the furnace (1). The heating furnace (1) is of a vertical type and constructed of a refractory material. A burner (4) and a steam feed opening (7) are provided at the bottom portion of the heating furance (1). A gaseous or liquid fuel and air are supplied to the burner (4) and burned in the heating furnace (1). Steam generated by a boiler (12) or the like is fed into the heating furnace (1) through the steam feed opening (7) while controlling its flow rate by a needle valve or the like.

The glass material is dispersed in a flame mixed with steam, heated, and rise together with the burning gas through the furnace while forming hollow glass spheres. The glass spheres or bubbles are finally collected by a cyclone (2) via a hood (8) and a duct (9). A very small amount of the glass bubbles which are not collected by the cyclone (2) are collected by a bag filter (3).

A powder having a particle diameter of less than 100 microns and an average particle diameter of 30 microns of an alkali borosilicate glass having the composition containing, by wt. %, 68.4 $SiO_2$, 10.3 $B_2O_3$, 0.94 ZnO, 19.4 $Na_2O$, 0.82 $SO_3$ and the balance 0.14 was used as the starting material, and hollow glass spheres (sample Nos. 1 to 6 shown in Table 1) were produced by using the apparatus shown in FIG. 1 under the heating conditions shown in Table 1.

TABLE 1

| | Prior art | | Invention | | | |
|---|---|---|---|---|---|---|
| Sample No. | 1 | 2 | 3 | 4 | 5 | 6 |
| Heating conditions | | | | | | |
| Fuel | Butane | Natural gas | Natural gas | Natural gas | Natural gas | Natural gas |
| Amount of glass powder fed (kg/h) | 15 | 15 | 15 | 15 | 15 | 15 |
| Amount of fuel fed (m³/h) | 10.8 | 10.8 | 10.8 | 8.7 | 10.8 | 10.8 |
| Amount of air fed (m³/h) | 334 | 116 | 116 | 93 | 93 | 116 |
| Amount of steam fed (m³/h) | — | — | 13.4 | 10.7 | 10 | 6.1 |
| Maximum temperature in the furnace (°C.) | 1450 | 1462 | 1400 | 1370 | 1365 | 1435 |
| Partial steam pressure in the furnace | 0.15 | 0.17 | 0.26 | 0.26 | 0.27 | 0.22 |
| Hollow glass spheres | | | | | | |
| Average specific gravity | 0.60 | 0.54 | 0.34 | 0.39 | 0.28 | 0.37 |

TABLE 1-continued

|  |  | Prior art | | Invention | | | |
|---|---|---|---|---|---|---|---|
| Sample No. |  | 1 | 2 | 3 | 4 | 5 | 6 |
| Proportion of water floating spheres (%)* |  | 35 | 43 | 68 | 60 | 75 | 65 |
| Average specific gravity of the water floating spheres |  | 0.35 | 0.31 | 0.18 | 0.23 | 0.16 | 0.20 |
| Composition of the water floating matter (%) | $SiO_2$ |  | 85.4 | 88.8 |  | 92.8 |  |
|  | $B_2O_3$ |  | 1.83 | 1.18 |  | 0.73 |  |
|  | $ZnO$ |  | 0.19 | 0.13 |  | 0.13 |  |
|  | $Na_2O$ |  | 11.1 | 9.4 |  | 5.9 |  |
|  | $SO_3$ |  | 0.34 | 0.40 |  | 0.43 |  |
|  | Others |  | 1.14 | 0.09 |  | 0.01 |  |

*The weight percent of the hollow glass spheres floating on water based on all the glass spheres obtained.

As is clear from the results of Table 1, the expansion ratio of the hollow glass spheres is increased, and the yield of the product can be markedly increased, by the method of this invention. Furthermore, the amount of the fuel can be reduced without lowering the yield (see sample No. 4). Furthermore, since the maximum temperature within the furnace can be drastically lowered, damages of the apparatus can be reduced.

What we claim is:

1. A method for producing glass bubbles, which comprises heating a glass powder containing a gas-blowing agent in an atmosphere containing steam having a partial steam pressure of 0.2 to 0.5 atmosphere at a temperature of about 1000° to 1600° C. to expand it.

2. The method of claim 1 wherein the partial pressure of steam in the atmosphere is within the range of 0.23 to 0.4 atmosphere.

3. The method of claim 1 wherein the atmosphere is a reducing atmosphere.

4. The method of claim 1 wherein the glass powder, a fuel, air for burning, and water are fed to a heating chamber, and by burning the fuel, the glass powder is heated and expanded.

5. The method of claim 4 wherein the water is steam, and is fed to the heating chamber simultaneously with the supplying of the glass powder.

* * * * *